United States Patent
O'Hare (10) Patent No.: US 10,039,362 B2
(45) Date of Patent: Aug. 7, 2018

(54) LUGGAGE WITH WEIGHT SENSORS

(71) Applicant: The Selfweighing Suitcase Company Limited, Dublin (IE)

(72) Inventor: John O'Hare, County Dublin (IE)

(73) Assignee: SELFWEIGHING SUITCASE COMPANY, Dublin (IE)

( * ) Notice: Subject to any disclaimer, the term of this patent is extended or adjusted under 35 U.S.C. 154(b) by 211 days.

(21) Appl. No.: 15/152,795

(22) Filed: May 12, 2016

(65) Prior Publication Data

US 2017/0325561 A1    Nov. 16, 2017

(51) Int. Cl.
| | |
|---|---|
| *G01G 19/52* | (2006.01) |
| *A45C 5/03* | (2006.01) |
| *A45C 5/14* | (2006.01) |
| *A45C 13/00* | (2006.01) |
| *G01G 19/58* | (2006.01) |
| *A45C 15/00* | (2006.01) |
| *A45C 13/26* | (2006.01) |

(52) U.S. Cl.
CPC ............... *A45C 15/00* (2013.01); *A45C 5/03* (2013.01); *A45C 5/14* (2013.01); *A45C 13/262* (2013.01); *G01G 19/52* (2013.01); *G01G 19/58* (2013.01)

(58) Field of Classification Search
CPC .......... G01G 19/52; G01G 19/58; A45C 5/03; A45C 5/14; A45C 13/262; A45C 15/00
See application file for complete search history.

(56) References Cited

U.S. PATENT DOCUMENTS

| | | | | |
|---|---|---|---|---|
| 5,823,278 A | * | 10/1998 | Geringer | G01G 19/445 177/144 |
| 7,265,302 B2 | * | 9/2007 | Keech | G01G 19/58 177/245 |
| 7,350,607 B2 | * | 4/2008 | Park | A45C 5/14 180/19.1 |
| 7,378,604 B2 | * | 5/2008 | Truong | A45C 13/28 177/131 |

(Continued)

FOREIGN PATENT DOCUMENTS

| | | |
|---|---|---|
| GB | 2478020 A | 8/2011 |
| GB | 2496144 A | 5/2013 |

(Continued)

OTHER PUBLICATIONS

Search Report / GB1403670.1 / dated Jul. 18, 2014.

*Primary Examiner* — Randy Gibson
(74) *Attorney, Agent, or Firm* — Fulwider Patton LLP (57) ABSTRACT

A self-weighing luggage device comprises a housing with a towing handle at one end and four wheel units mounted at the other end. Four weight determining sensors are incorporated into the wheel units, respectively. Each weight determining sensor is wired to a central circuit board, which is mounted on the inner surface of other end at position. The central circuit board is connected to a Liquid Crystal Display (LCD) mounted in a recess in the handle end of the housing, which recess is adapted to receive the handle in a stowed position, such that the LCD is protected by the handle. In use, the self-weighing luggage device is stood on the ground on the four wheel units and the weight readings from each weight determining sensor are combined to give the total weight of the self-weighing luggage device, which total weight is displayed on the LCD.

10 Claims, 8 Drawing Sheets

(56) References Cited

U.S. PATENT DOCUMENTS

| | | | |
|---|---|---|---|
| 7,439,456 B2* | 10/2008 | Ogunnaike | A45C 13/00 |
| | | | 177/148 |
| 8,188,714 B2* | 5/2012 | Petrick | G06F 1/182 |
| | | | 320/107 |
| 8,434,577 B1 | 5/2013 | Al-Qaffas | |
| 8,653,385 B2* | 2/2014 | Li | A45C 5/14 |
| | | | 177/245 |
| 9,448,099 B2* | 9/2016 | Zhao | A45C 15/00 |
| 9,804,018 B1* | 10/2017 | Muccillo | G01G 19/414 |
| 2005/0217904 A1* | 10/2005 | Hughes | A45C 15/00 |
| | | | 177/245 |
| 2006/0266563 A1* | 11/2006 | Kaplan | G01G 19/58 |
| | | | 177/245 |
| 2016/0231166 A1* | 8/2016 | Malhotra | G01G 19/52 |
| 2017/0227395 A1* | 8/2017 | Esmail | G01G 19/52 |

FOREIGN PATENT DOCUMENTS

| | | | | |
|---|---|---|---|---|
| GB | 2523749 A | * | 9/2015 | G01G 19/58 |
| JP | 11221113 A | | 8/1999 | |
| WO | WO 8404027 A1 | * | 10/1984 | G01G 19/58 |

* cited by examiner

LUGGAGE WITH WEIGHT SENSORS

BACKGROUND

This invention relates to a luggage device and, in particular, to a self-weighing luggage device for travelling.

Rising fuel costs and environmental taxes have resulted in increased costs for airlines. These increased costs are typically passed on to the customer as additional charges, such as by levying excess baggage fees.

Checked luggage is usually measured by weight. All checked items are generally weighted by the airline, and should the luggage exceed the limitations of the baggage allowance as regards the number of pieces, their dimensions or their weight, the airline will charge a fee for the excess baggage. This is one of the most common extra charges incurred by passengers, as more weight on an airplane means higher fuel consumption and running costs for the airline.

Thus, airlines encourage customers to keep the amount of luggage to a minimum to keep running costs down. Furthermore, passenger airlines also carry some freight. Thus, the less weight of luggage being carried on a particular flight the more freight that can be accommodated. To help reduce the overall weight of passenger luggage some airlines offer lower fares to customers who only have hand luggage.

Passengers who exceed a maximum weight limit for a piece of luggage typically have to decide on whether to pay for the extra luggage weight, to leave items behind at the airport, or to start moving items from one bag to another so as to comply with the weight limits. This can be very inconvenient, embarrassing and time consuming.

Carrying hand luggage only can be advantageous for a passenger as it speeds up his check-in time at departure and, more significantly, his transit time through arrivals, at his destination airport. A consequence of his hand luggage exceeding the weight limit for a particular flight is that the airline staff may insist that the piece of luggage be placed in the hold of the aircraft. Thus, the potential saving in transit time on arrival is lost.

On some airlines, there is a set weight limit for an individual's luggage, and the carrying of luggage above the weight limit may be prohibited. Thus, it is important for the passenger to know, in advance, that his luggage weight is under this maximum limit.

One current method of determining the weight of a piece of luggage is to use a portable set of weighing scales, which is attachable to a piece of luggage. However, this method requires that the piece of luggage be lifted off the ground before the weight can be measured. This is not practicable for some users, such as wheelchair-bound individuals and the elderly.

U.K. Patent No. 2478020 describes a self-weighing luggage device for holding pieces of luggage therein, which has a housing having a towing handle at one end and one or more wheels at the other end. A weight determining unit is mounted on the wheel end of the housing and consists of a plurality of ground engaging feet, with each foot having a strain gauge-based, load cell positioned therein. In use, the luggage device is filled with luggage and stood on the ground engaging feet. The weight measurement from each load is captured and a readout of the weight of the luggage device and contents is displayed.

The design of the luggage device works well, when it is configured as a two-wheel device. However, it will not work in a four wheel configuration without modification to the weighing unit, as the ground engaging feet have to contact the ground for the weighing procedure, while the wheels are clear of the ground. Whereas the four wheels need to contact the ground when the luggage is being pulled along, and at the same time the ground engaging feet need to be clear of the ground.

SUMMARY OF THE INVENTION

It is an object of the present invention to overcome the disadvantages of the self-weighing luggage device hereinbefore described.

Thus, the invention provides a self-weighing luggage device, comprising a housing for holding pieces of luggage therein, the housing having a towing handle at one end thereof and one or more wheel units mounted at the other end thereof, a plurality of sensors for determining the weight of the luggage device and of any contents therein, in use, the and each weight determining sensor being mounted at the wheel end of the housing, with at least one of the weight determining sensors being incorporated into one of the wheel units, and means for displaying the determined weight.

An advantage of the self-weighing luggage device according to the invention is that, by incorporating at least one of the weight determining sensors into one of the wheel units, the arrangement of the weight determining sensors on the other end of the housing is simplified. Thus, the wheel does not have to be kept clear of the ground during the weighing procedure.

A further advantage of the self-weighing luggage device according to the invention is that it allows the user to weigh and transport the luggage device without having to lift it off the ground. Thus, elderly or wheelchair-bound individuals can weigh their luggage without exerting any significant effort.

Preferably, a control unit is mounted on the housing and is in electronic communication with the and each weight determining sensor, the and each weight determining sensor having a ground engaging member and a load sensor, which load sensor, in use, detects the load at the corresponding ground engaging member, which load reading is communicated to the control unit, with the sum of the load readings from the and each weight determining sensor being displayed as the weight of the luggage device and of any contents therein.

An advantage of summing the readings from the and each weight determining sensor is that the self-weighing luggage device will give an accurate weight reading even when the ground on which it is placed may not be level.

In one embodiment of the invention, the other end of the housing is of a generally rectangular shape with two wheel units mounted thereon in a spaced apart fashion, such that one wheel unit is mounted near a corner of the other end and the remaining wheel unit is mounted near an adjacent corner of the other end, a ground-engageable foot being mounted near each of the remaining corners of the other end, and with a weight determining sensor being incorporated into each wheel unit and each ground-engageable foot.

An advantage of this two-wheel embodiment of the invention is that the orientation of the wheel units can be fixed, as the luggage device is usually tilted and pulled behind the user. Thus, the ground-engageable feet will be clear of the ground. During the weighing procedure the luggage device can be placed in an upright position, resting on the two wheel units and the two ground-engageable feet, with all of the weight determining sensors providing a reading.

In a further embodiment of the invention, the other end of the housing is of a generally rectangular shape with a wheel unit mounted thereon near each corner thereof and with a weight determining sensor being incorporated into each wheel unit.

An advantage of this four-wheel embodiment of the invention is that the luggage device is supported on the four wheel units during both the weighing procedure and while the luggage device is being moved along.

Preferably, the and each wheel unit is a castoring unit.

An advantage of castoring wheels is that the luggage device may be either pulled or pushed along and will negotiate bends with ease.

In a further embodiment of the invention, means for dissipating any electrostatic charge accumulated on the luggage device in use is associated with one of the weight determining sensors.

An advantage of the self-weighing luggage device is that it dissipates any electrostatic charge accumulated through use, thereby preventing damage to any electronic components and extending their lifespan.

A further advantage of this feature of the invention is that any electronic components of the weight determining sensors will not be affected by electrostatic charge. Thus, the performance and accuracy of the weight determining sensors will be maintained.

Electrostatic charge accumulation can have some potentially serious consequences for luggage on an aircraft. If the voltage becomes high enough it may cause a spark to ignite nearby flammable materials. Thus, the addition of a means for dissipating any electrostatic accumulation results in increased safety.

Preferably, the or each wheel unit incorporates a wheel made of conductive material, which wheel unit acts as an earthing point for the electrostatic charge dissipating means.

An advantage of incorporating the electrostatic charge dissipating means into a wheel unit is that it results in a saving on manufacturing costs.

In a further embodiment of the invention, where two wheel units are mounted on the other end of the housing, one of the ground-engageable feet has a metallic ground-engaging contact, which contact acts as an earthing point for the electrostatic charge dissipating means.

An advantage of this arrangement is that a separate electrostatic charge dissipating means is not required to be fitted to the luggage device.

In a further embodiment of the invention, the means for displaying the weight is a Liquid Crystal Display (LCD), which is mounted in a recess in the handle end of the housing, which recess is adapted to receive the handle in a stowed position, such that the LCD is protected by the handle.

An advantage of this feature of the invention is that by positioning the LCD directly underneath the handle, the display is protected from possible impact damage during transit.

In a further embodiment of the invention, the device is connectable to a remote screen on which the weight can be displayed, the device being connectable to the remote screen via a wireless device such as Bluetooth®.

An advantage of this feature of the invention is that the luggage device may be wirelessly connected to a device, such as a mobile phone. Thus, details of the weight of the luggage device may be transmitted to either the owner's phone or the phone of a third party. Thus, for instance, a group leader could receive details of the weight of each group member's luggage and sort out any overweight issues within the group before the luggage is presented at check-in.

In a further embodiment of the invention, the wireless device acts as a locator for the luggage device, with a signal from the wireless device being capable of being detected by a mobile device, such as a smart phone or a computer, when the luggage device and the mobile device are in close proximity.

An advantage of this aspect of the invention is that an individual's luggage device can be more easily located on a luggage carousel, without the need to examine each piece of luggage as it passes on the carousel.

BRIEF DESCRIPTION OF THE DRAWINGS

The invention will be further illustrated by the following description of embodiments thereof, given by way of example only with reference to the accompanying drawings in which.

DETAILED DESCRIPTION OF THE PREFERRED EMBODIMENTS

Figure 1:
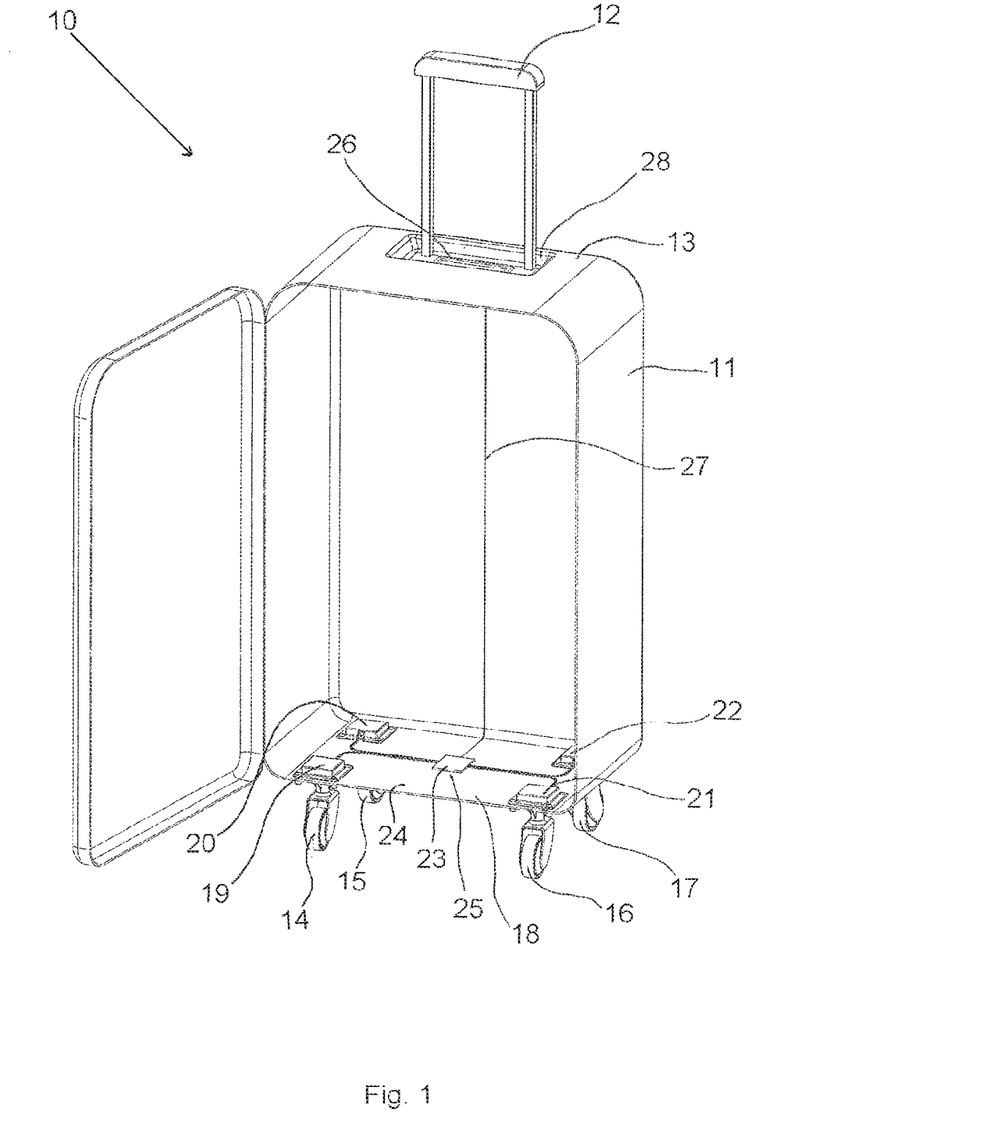
FIG. 1 is a perspective view of a self-weighing luggage device in accordance with the invention.

Referring to FIG. 1, there is illustrated generally at 10, a self-weighing luggage device in accordance with the invention. The inner lining of the self-weighing luggage device 10 has been removed for illustrative purposes. The self-weighing luggage device 10 comprises a housing 11 for holding pieces of luggage therein, the housing 11 having a towing handle 12 at one end 13 thereof and four wheel units 14, 15, 16, 17 mounted at the other end 18 thereof. Four weight determining sensors 19, 20, 21, 22 are incorporated into the wheel units 14, 15, 16, 17, respectively. Each weight determining sensor 19, 20, 21, 22 is wired to a central circuit board 23, which is mounted on inner surface 24 of the other end 18 at position 25.

The central circuit board 23 is connected to a Liquid Crystal Display (LCD) 26 by a wire 27. The LCD 26 is mounted in a recess 28 in the handle end 13 of the housing 11, which recess 28 is adapted to receive the handle 12 in a stowed position, such that the LCD 26 is protected by the handle 12.

Figure 2:
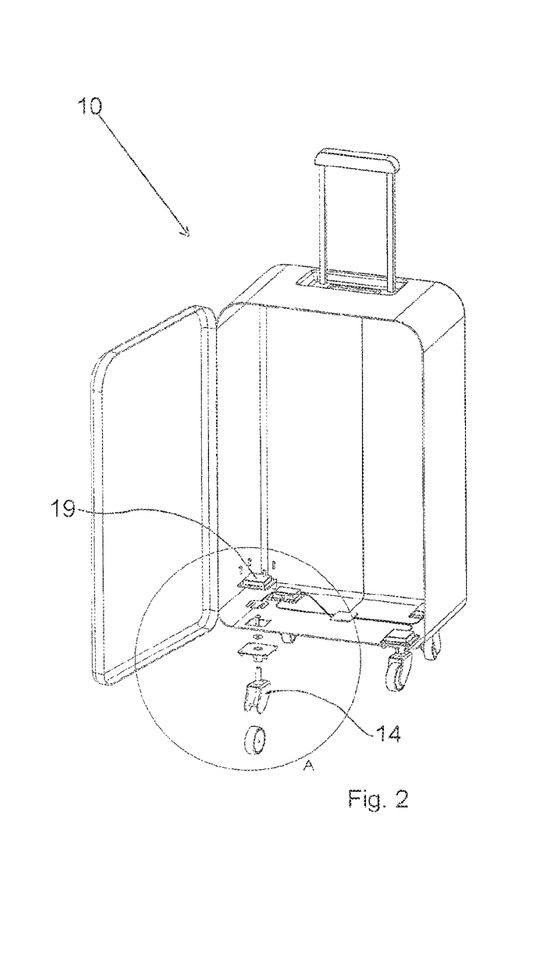
FIG. 2 is a perspective view of the device of FIG. 1 with a wheel unit shown in an exploded view.

Referring to FIG. 2, the wheel unit 14 and the associated weight determining sensor 19 are illustrated in an exploded view within the circle marked A.

Figure 3:
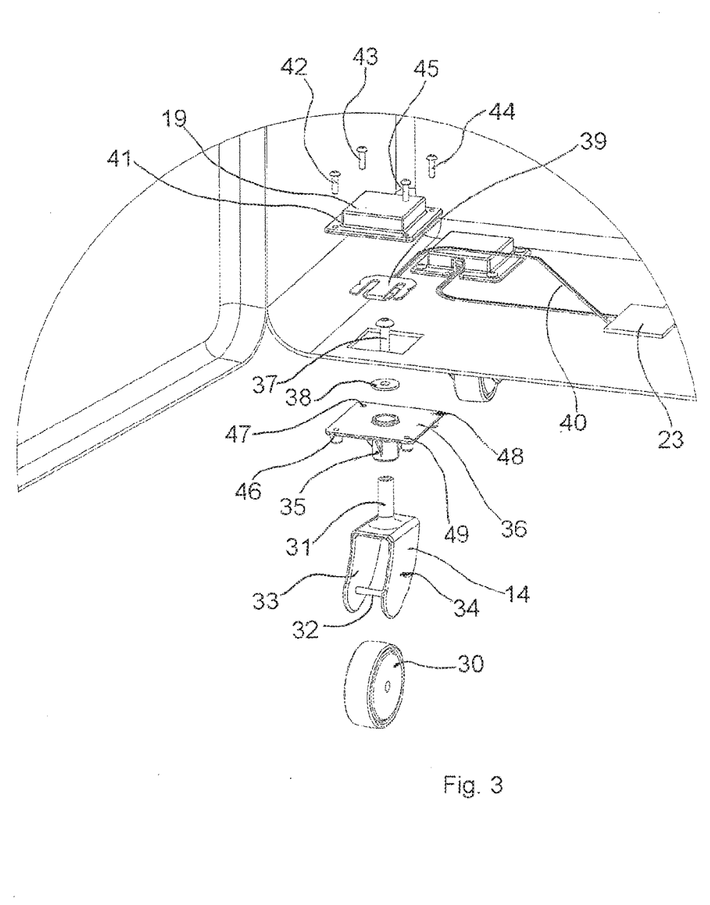
FIG. 3 is an enlarged view of the exploded wheel unit, marked A of FIG. 2.

Referring to FIG. 3, the exploded view A of FIG. 2 is shown in an enlarged view. Wheel unit 14 comprises a wheel 30, a pivot piece 31, to which the wheel 30 is attachable, such that it is rotatable on an axle 32, which axle is mounted between two flanges 33, 34 of the pivot piece 31. The pivot piece 31 is locatable within a central bore 35 of a bottom casing 36 and is retained therein by a screw 37 and washer 38.

The weight determining sensor 19 comprises a load sensor 39, which is connected to the central circuit board 23 by a wire 40. A top casing 41 covers and protects the load sensor 39, when assembled. Four screws 42, 43, 44, 45 are locatable in threaded retaining holes 46, 47, 48, 49, respectively, in the bottom casing 36, such that, when assembled, the wheel end 18 is sandwiched between bottom casing 36 and top casing 41.

Figure 4:
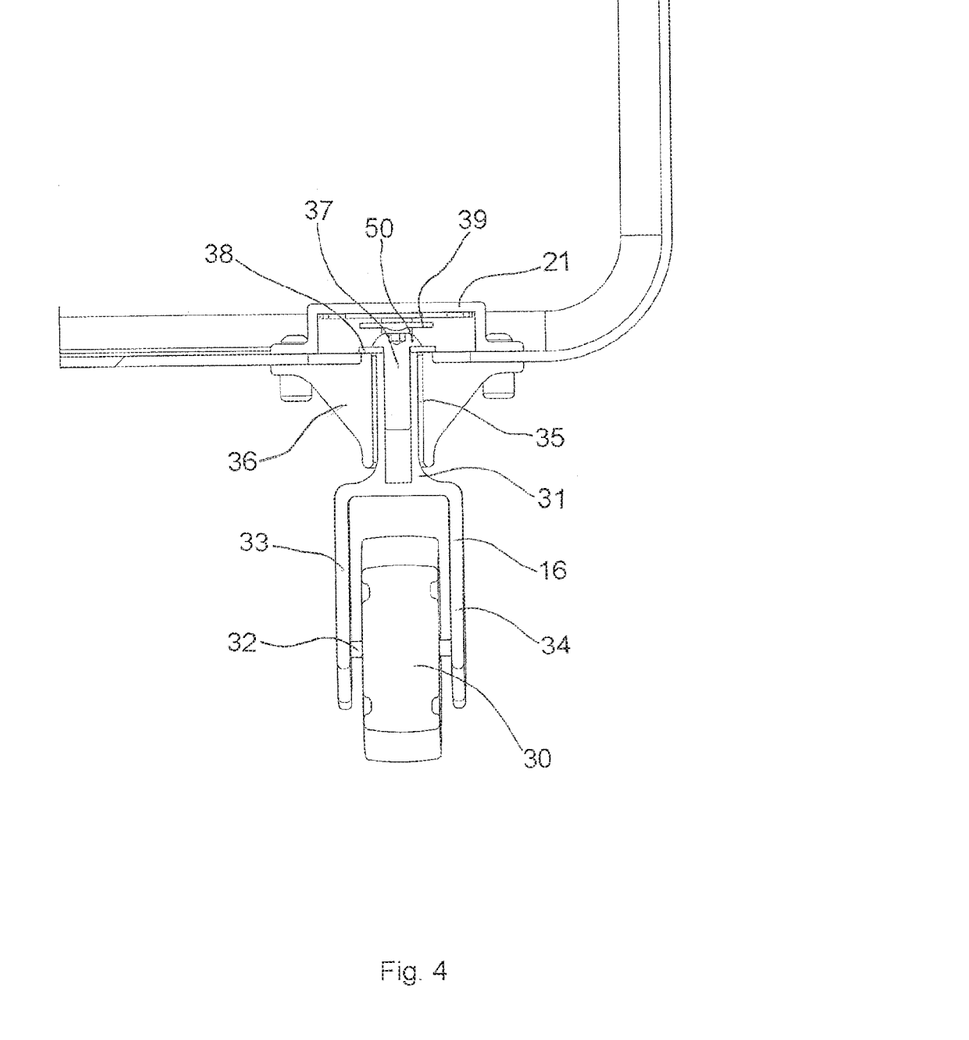
FIG. 4 is a section view of a wheel unit of the luggage device of FIG. 1.

Referring to FIG. 4, the wheel unit 16 of FIG. 1 is shown in section. As the wheel units 14, 15, 16, 17 of FIG. 1 are identical, individual components have been assigned the same reference numerals for each wheel unit 14, 15, 16, 17. The wheel unit 16 comprises wheel 30, pivot piece 31, to which the wheel 30 is attachable such that it is rotatable on an axle 32, which axle is mounted between two flanges 33, 34 of the pivot piece 31. The pivot piece 31 is locatable within central bore 35 of bottom casing 36 and is retained therein by a screw 37 and washer 38.

The wheel unit 16 is free to rotate within the central bore 35 and the two flanges 33, 34 are curved such that a castoring effect is imparted to the wheel 30.

In use, head 50 of screw 37 contacts the load sensor 39, within the weight determining sensor 21, and the load on that wheel 16 is communicated to the central circuit board 23 (FIG. 1).

The wheel unit 16 is made of a conductive material and acts as a means for dissipating any electrostatic charge build up on the self-weighing luggage device 10, in use.

Figure 5:
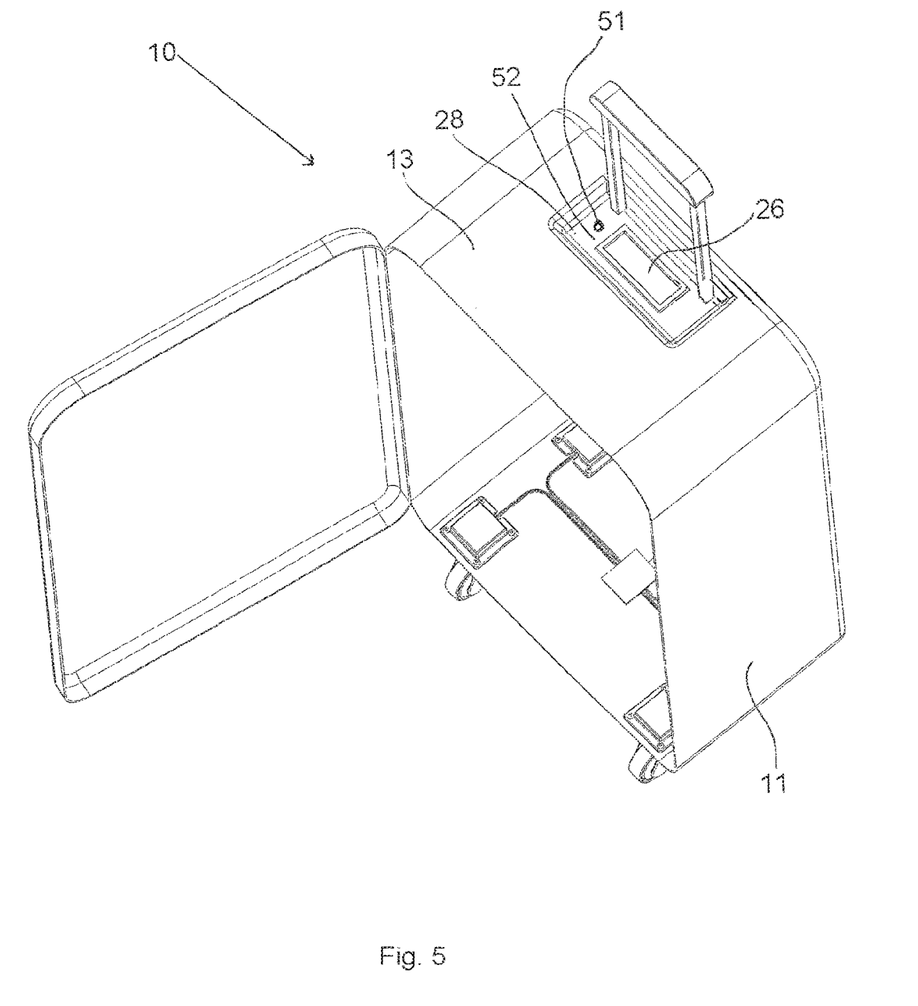
FIG. 5 is a perspective view from above and to one side of the self-weighing luggage device of FIG. 1.

Referring to FIG. 5, the self-weighing luggage device 10 is illustrated from above and to one side. The LCD 26 is shown mounted in the recess 28 in the handle end 13 of the housing 11. A reset button 51 is mounted in the recess 28 to one side 52 of the LCD 26.

Referring to FIGS. 1 to 5, in use, when the self-weighing luggage device 10 is stood on the wheel units 14, 15, 16, 17, and the reset button 51 is depressed, the load on each of the sensors 19, 20, 21, 22 is transferred to the central circuit board 23, where the weight of the self-weighing luggage device, and of any pieces of luggage therein, is calculated from the sum of the load values received. The calculated weight is then displayed on the LCD 26.

When the housing 11 of the self-weighing luggage device 10 is empty, the weight displayed on the LCD 26 is the weight of the self-weighing luggage device 10 alone. Once the housing is filled and the rest button 51 is depressed, the displayed weight represents the weight of the self-weighing luggage device 10 and the contents thereof.

An additional piece of luggage may also be weighed by placing it on the weighed self-weighing luggage device 10 after depressing the reset button 51.

Figure 6:
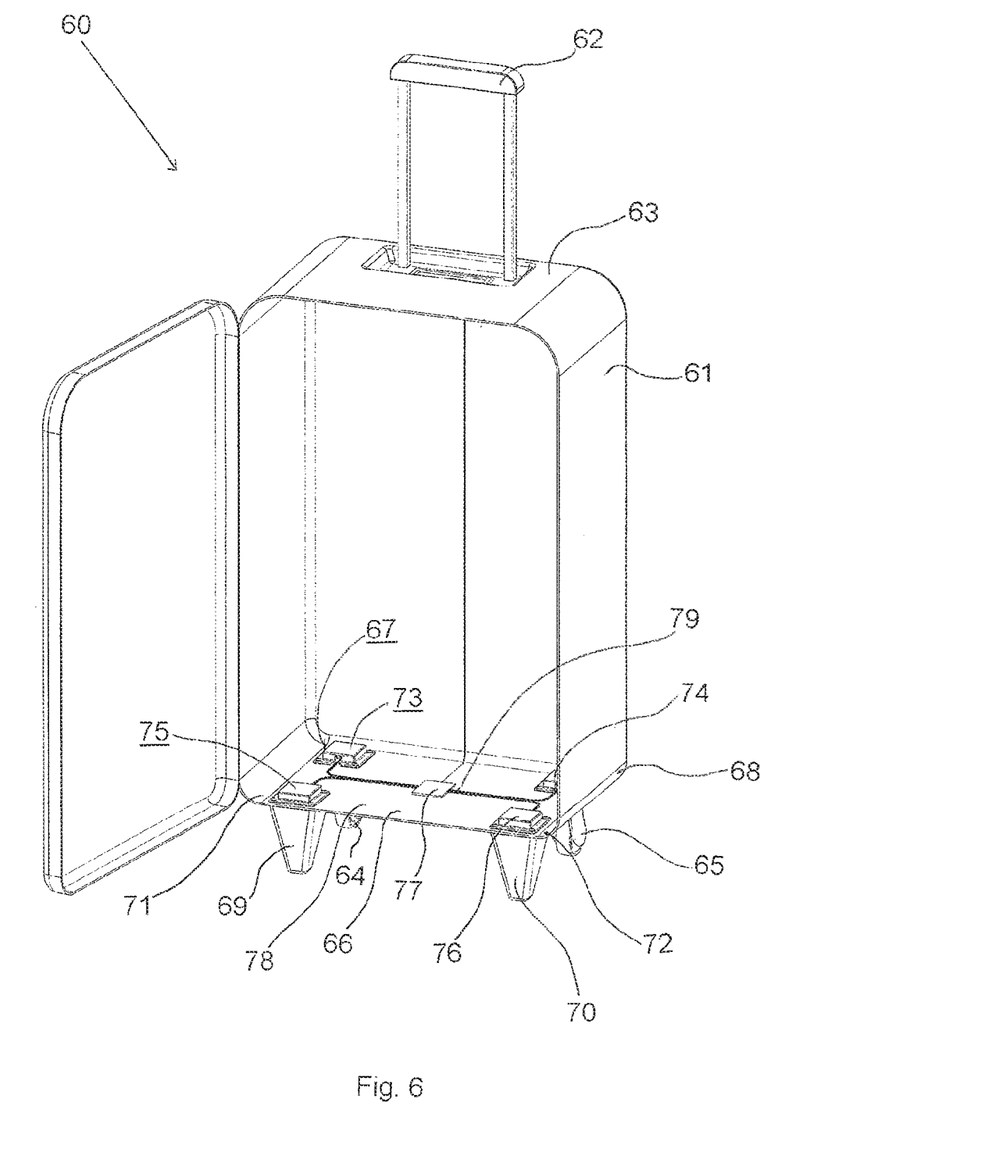
FIG. 6 is a perspective view of a further embodiment of a self-weighing luggage device in accordance with the invention.

Referring to FIG. 6, there is illustrated generally at 60, a further embodiment of the self-weighing luggage device in accordance with the invention. The inner lining of the self-weighing luggage device 60 has been removed for illustrative purposes. The self-weighing luggage device 60 comprises a housing 61 for holding pieces of luggage therein, the housing 61 having a towing handle 62 at one end 63 thereof. Two wheel units 64, 65 are mounted on the other end 66 of the housing 61 near the rear corners 67, 68, respectively. Two ground-engageable feet 69, 70 are mounted near front corners 71, 72, respectively of the other end 66. Four weight determining sensors 73, 74, 75, 76 are incorporated into wheel units 64, 65, and ground-engageable feet 69, 70, respectively.

Each weight determining sensor 73, 74, 75, 76 is wired to a central circuit board 77, which is mounted on inner surface 78 of the other end 66 at position 79.

Figure 7:
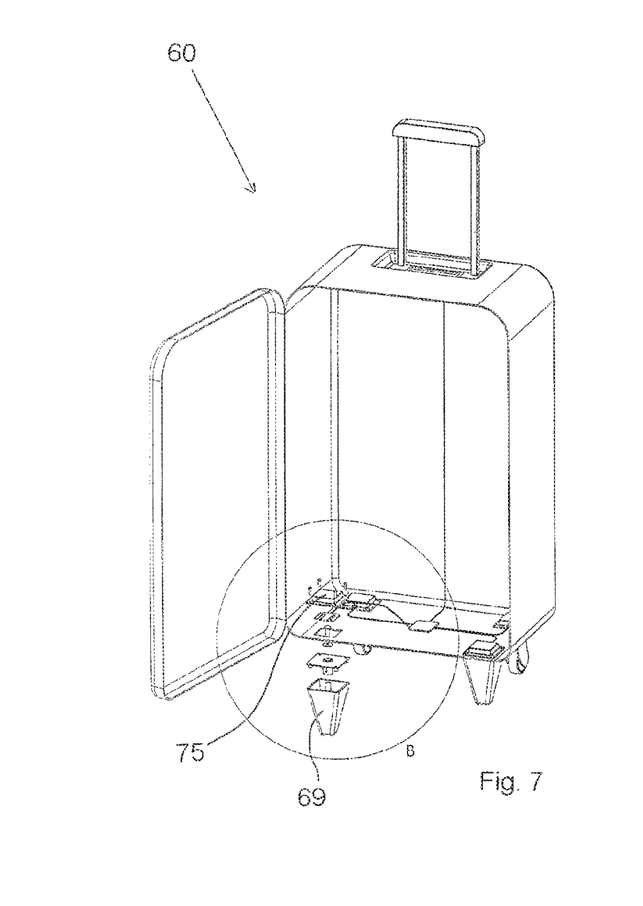
FIG. 7 is a perspective view of the device of FIG. 6 with a ground-engageable foot shown in an exploded view.

Referring to FIG. 7, the ground-engageable foot 69 and the associated weight determining sensor 75 are illustrated in an exploded view within the circle marked B.

Figure 8:
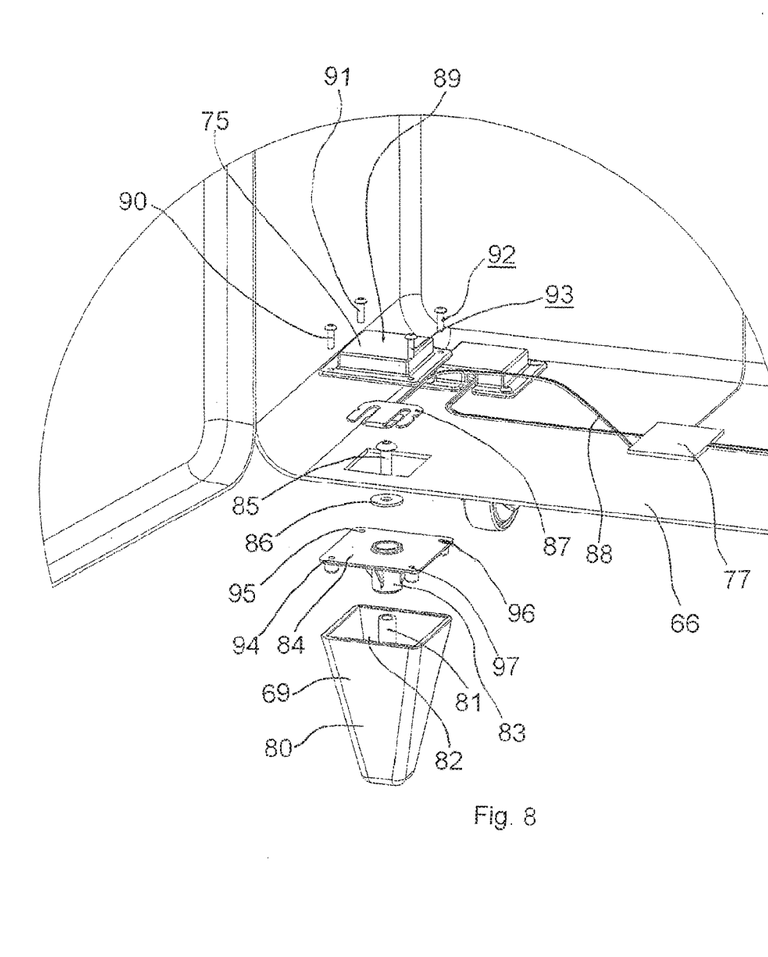
FIG. 8 is an enlarged view of the exploded ground-engageable foot, marked B of FIG. 7.

Referring to FIG. 8, the exploded view B of FIG. 7 is shown in an enlarged view. Ground-engageable foot 69 comprises a foot body 80 having a cylindrical member 81 located centrally therein and protruding out of top opening 82 of the foot body 80. The cylindrical member 81 is locatable within a central bore 83 of a bottom casing 84 and is retained therein by a screw 85 and washer 86.

The weight determining sensor 75 comprises a load sensor 87, which is connected to the central circuit board 77 by a wire 88. A top casing 89 covers and protects the load sensor 87, when assembled. Four screws 90, 91, 92, 93 are locatable in threaded retaining holes 94, 95, 96, 97, respectively, in the bottom casing 84, such that, when assembled, the other end 66 is sandwiched between the bottom casing 84 and top the casing 89.

Figure 9:
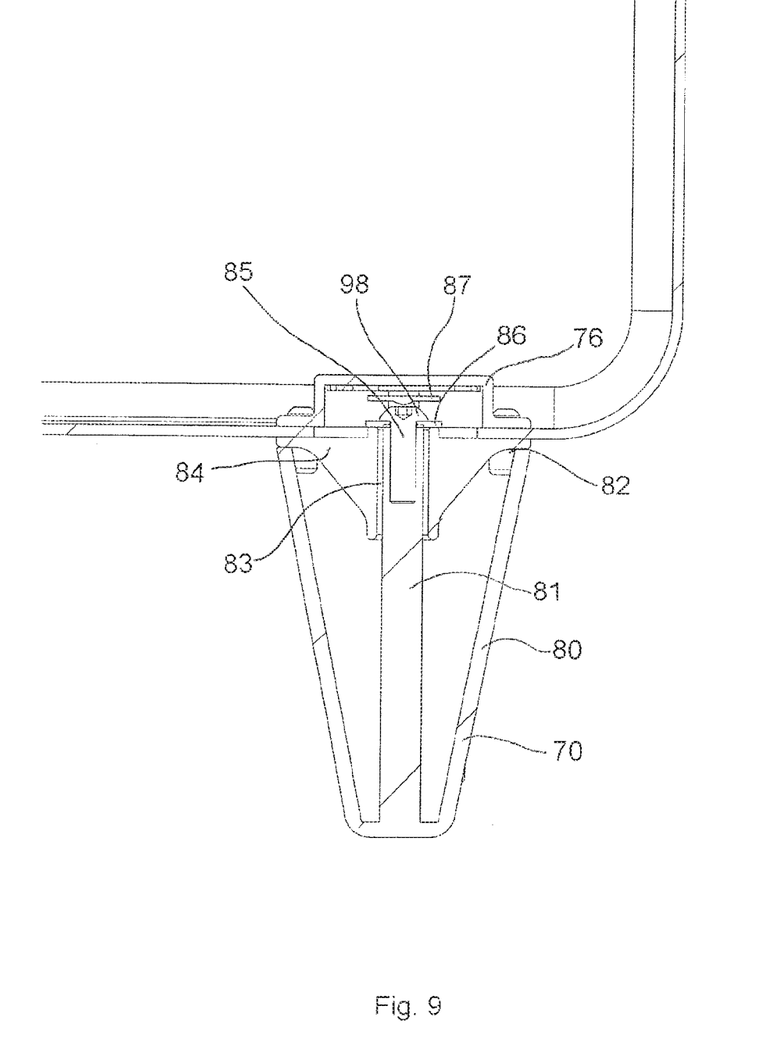
FIG. 9 is a section view of a ground-engageable foot of the luggage device of FIG. 6.

Referring to FIG. 9, the ground-engageable foot 70 of FIG. 6 is shown in section. As the ground-engageable feet 69, 70 of FIG. 6 are identical, individual components have been assigned the same reference numerals for each ground-engageable foot 69, 70. Ground-engageable foot 70 comprises a foot body 80 having a cylindrical member 81 located centrally therein and protruding out of the top opening 82 of the foot body 80. The cylindrical member 81 is locatable within a central bore 83 of a bottom casing 84 and is retained therein by a screw 85 and washer 86.

In use, head 98 of screw 85 contacts the load sensor 87, within the weight determining sensor 76, and the load on that the ground-engageable foot 70 is communicated to the central circuit board 77 (FIG. 6).

Figure 10:
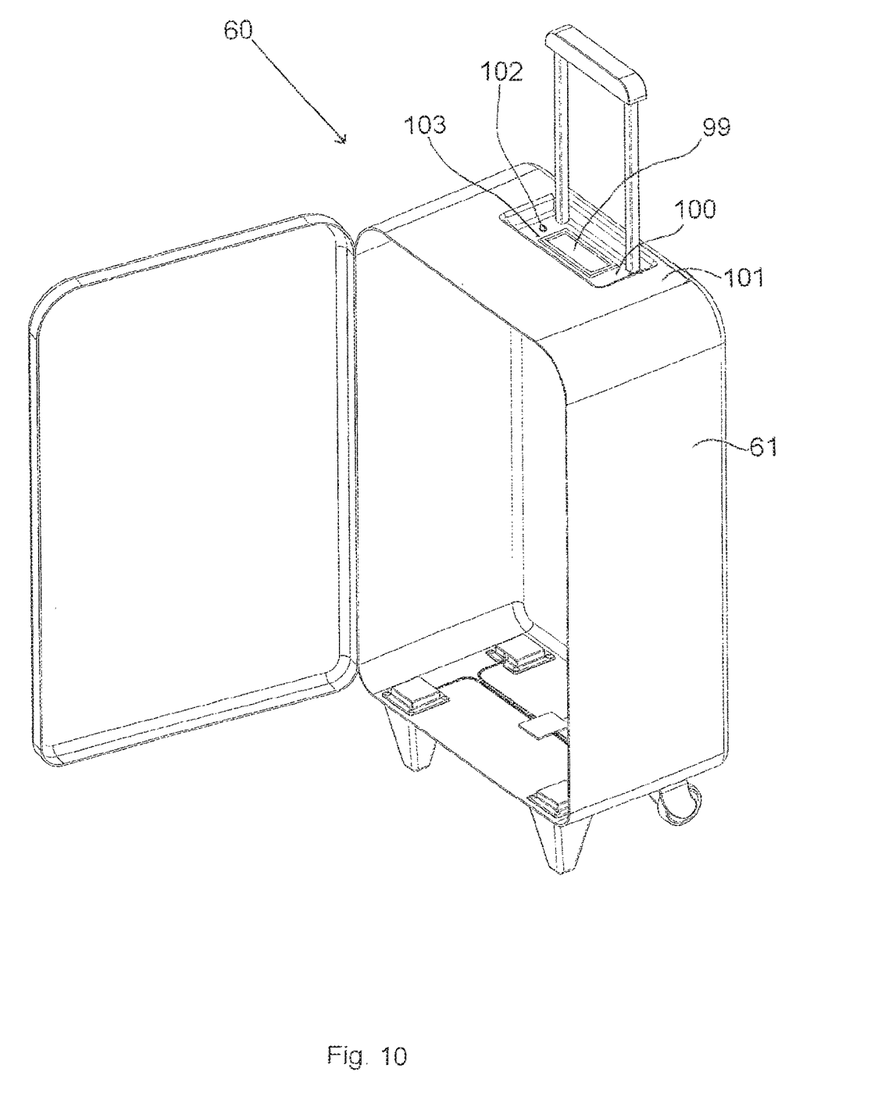
FIG. 10 is a perspective view from above and to one side of the self-weighing luggage device of FIG. 6.

Referring to FIG. 10, the self-weighing luggage device 60 is illustrated from above and to one side. An LCD 99 is shown mounted in a recess 100 in handle end 101 of the housing 61. A reset button 102 is mounted in the recess 100 to one side 103 of the LCD 99.

Referring to FIGS. 6 to 10, the weighing procedure for the self-weighing luggage device 60 is the same as that for the device 10 of FIGS. 1 to 5.

The foregoing represents the Applicant's best mode of carrying out the invention. Although specific embodiments are shown, the invention is not intended to be strictly limited to such specific embodiments. One of ordinary skill in the art would readily recognize various modifications and substitutions to the preceding embodiments, and the invention is intended to incorporate and include all such modifications and substitutions. Accordingly, the scope of the invention is measured by the appended claims using their customary and ordinary meanings, in light of the descriptions and figures included herewith.

I claim:

1. A self-weighing luggage device, comprising a housing for holding pieces of luggage therein, the housing having a towing handle at one end thereof and one or more wheel units mounted at the other end thereof, a plurality of sensors for determining a weight of the luggage device and of any contents therein, in use, each weight determining sensor being mounted at the wheel end of the housing, with at least one of the weight determining sensors being incorporated into one of the wheel units, a display for displaying a determined weight, and wherein at least one of the weight determining sensors includes a ground for dissipating electrostatic charge accumulated on the luggage device.

2. The self-weighing luggage device of claim 1, wherein a control unit is mounted on the housing and is in electronic communication with each weight determining sensor, each weight determining sensor having a ground engaging member and a load sensor, which load sensor, in use, detects a load at a corresponding ground engaging member, which load reading is communicated to the control unit, with the sum of the load readings from each weight determining sensor being displayed as a weight of the luggage device and of any contents therein.

3. A self-weighing luggage device, comprising a housing for holding pieces of luggage therein, the housing having a towing handle at one end thereof and one or more wheel units mounted at the other end thereof, a plurality of sensors for determining a weight of the luggage device and of any contents therein, in use, each weight determining sensor being mounted at the wheel end of the housing, with at least one of the weight determining sensors being incorporated into one of the wheel units, and a display for displaying a determined weight;
wherein a control unit is mounted on the housing and is in electronic communication with each weight determining sensor, each weight determining sensor having a ground engaging member and a load sensor, which load sensor, in use, detects a load at a corresponding ground engaging member, which load reading is communicated to the control unit, with the sum of the load readings from each weight determining sensor being displayed as a weight of the luggage device and of any contents therein; and
wherein a lower end of the housing is of a generally rectangular shape with two wheel units mounted thereon in a spaced apart fashion, such that one wheel unit is mounted near a corner and the remaining wheel unit is mounted near an adjacent corner of another end, a ground-engageable foot being mounted near each of remaining corners of the lower end, and with a weight determining sensor being incorporated into each wheel unit and each ground-engageable foot.

4. A self-weighing luggage device according to claim 2, wherein the lower end of the housing is of a generally rectangular shape with a wheel unit mounted thereon near each corner thereof and with a weight determining sensor being incorporated into each wheel unit.

5. A self-weighing luggage device according to claim 1, wherein each wheel unit is a castoring unit.

6. A self-weighing luggage device according to claim 1, wherein each wheel unit incorporates a wheel made of conductive material, which wheel acts as an earthing point for the ground to dissipate said electrostatic charge.

7. A self-weighing luggage device according to claim 1, wherein, where two wheel units are mounted on the lower end of the housing, one of the ground-engageable feet has a metallic ground-engaging contact, which contact acts as an earthing point for the ground to dissipate said electrostatic charge.

8. A self-weighing luggage device according to claim 1, wherein the display for displaying the weight is a Liquid Crystal Display (LCD), which is mounted in a recess in the handle end of the housing, which recess is adapted to receive the handle in a stowed position, such that the LCD is protected by the handle.

9. A self-weighing luggage device according to claim 1, wherein the device is connectable to a remote screen on which the weight can be displayed, the device being connectable to the remote screen via a wireless device.

10. A self-weighing luggage device according to claim 9, wherein the wireless device acts as a locator for the luggage device, with a signal from the wireless device being capable of being detected by an electronic device when the luggage device and the mobile device are in close proximity.

* * * * *